United States Patent
Hermens

(10) Patent No.: US 7,818,944 B2
(45) Date of Patent: Oct. 26, 2010

(54) WINDOW PANE WITH SECURITY ELEMENT

(75) Inventor: Ulrich Hermens, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 210 days.

(21) Appl. No.: 11/722,626

(22) PCT Filed: Dec. 22, 2005

(86) PCT No.: PCT/FR2005/051127
§ 371 (c)(1),
(2), (4) Date: Oct. 17, 2007

(87) PCT Pub. No.: WO2006/070159
PCT Pub. Date: Jul. 6, 2006

(65) Prior Publication Data
US 2008/0110109 A1    May 15, 2008

(30) Foreign Application Priority Data
Dec. 23, 2004    (DE) .................. 10 2004 062 060

(51) Int. Cl.
*E04C 2/54* (2006.01)
(52) U.S. Cl. ............. 52/786.13; 52/786.1; 52/786.11; 49/141; 49/501
(58) Field of Classification Search ............ 52/204.593, 52/204.52, 0.597, 811, 204.51, 207, 788.1, 52/786.1, 786.11, 786.13, 235; 49/141, 460, 49/501; 428/34
See application file for complete search history.

(56) References Cited

U.S. PATENT DOCUMENTS

| | | | | | |
|---|---|---|---|---|---|
| 4,145,844 | A | * | 3/1979 | Kaspar | 49/386 |
| 4,692,744 | A | * | 9/1987 | Hickman | 340/550 |
| 5,097,642 | A | | 3/1992 | Richardson et al. | |
| 6,158,483 | A | * | 12/2000 | Trpkovski | 141/63 |
| 6,318,027 | B1 | * | 11/2001 | Richardson et al. | 49/504 |
| 6,425,221 | B1 | * | 7/2002 | Reichert | 52/456 |
| 6,715,245 | B2 | * | 4/2004 | Lewkowitz | 52/208 |
| 2003/0150177 | A1 | * | 8/2003 | Baratuci et al. | 52/204.593 |

FOREIGN PATENT DOCUMENTS

| | | |
|---|---|---|
| DE | 202 04 692 | 7/2002 |
| DE | 20 2004 005 639 | 7/2004 |
| EP | 0 319 695 | 6/1989 |
| EP | 0 320 674 | 6/1989 |
| EP | 1 035 295 | 9/2000 |
| EP | 1 645 714 | 4/2006 |

* cited by examiner

Primary Examiner—David Dunn
Assistant Examiner—Adam Barlow
(74) Attorney, Agent, or Firm—Oblon, Spivak, McClelland, Maier & Neustadt, L.L.P.

(57) ABSTRACT

A window pane for attenuating the effect of a pressure or shock wave after an explosion, in which the window pane includes a safety element and at least two panes, placed at a distance from one another and enclosing a space between them, which are assembled together in their edge regions with aid of a spacing frame with formation of edge grooves. In the window pane the safety element is flexible, includes a material with a high tear strength, and is placed inside at least one of the edge grooves, and at least one end of the safety element is fed out of the edge groove.

21 Claims, 4 Drawing Sheets

WINDOW PANE WITH SECURITY ELEMENT

BACKGROUND OF THE INVENTION

I. Field of the Invention

The invention relates to a window pane with a safety element and a window or a door fitted with such a window pane.

II. Description of Related Art

European patent application EP 0 319 695 A1 discloses a structure of plates to be assembled to a supporting structure for the formation of a facade or a roof in a building. The structure of plates consists of a glass insulating plate made of several panes and a supporting frame bonded to the rear edge of the plates. The bonded assembly is, in this instance, attached by mechanical supports placed at certain points. The individual supports are assembled fixedly to the outer edge of the structure of plates for the formation of a structural unit, without extending up to their front outer face. They couple via the rear, furthermore without contact, a girdle of the supporting frame oriented toward the structure of plates. The anchoring of the supports to the outer pane may for example be provided such that the supports engage in notches in the peripheral rim of the outer pane of the glass insulating plate. In another embodiment, the supports engage in certain locations in a U-channel placed in the hollow peripheral space of the glass insulating plate.

European patent application EP 0 320 674 A2 relates to a plate consisting of individual panes with retention and/or safety members. The aforementioned plate consists of two sheets of glass bonded, by means of a layer of transparent adhesive, to one another and with first edge portions of the retention and/or safety members penetrating into the latter. The retention and/or safety members consist essentially of a flexible pad, which is preferably formed by a threaded fabric. The second edge portion of the retention and/or safety member emerging from the plate is attached to an infrastructure. When the plate is assembled to another pane oriented toward the infrastructure, in the manner of an insulating glazing unit, the outward-oriented plate is protected against destruction in the event of this assembly being ruined.

German utility model DE 20 2004 005 639 U1 discloses an explosion-prevention sash-glass composite which consists of a glass plate consisting of several panes and a metal channel frame receiving the glass plate. Between the individual panes of the glass plate there is a band of fabric or of plastic material with high tear strength bonded so that a pad of the band of fabric or of plastic material emerges from the glass plate. This pad is fed at right angles around the front face of the glass plate in the direction of the face situated opposite the effect of the explosion, and bonded, or bonded and additionally screwed to the metal channel frame.

European patent application EP 1 035 295 A2 discloses a window exposed to a pressure wave, in which the retention elements attached to the window sash are placed on the face of the window situated opposite the pressure wave. The retention elements are outside the window pane, consist of steel or plastic cables and contain energy-absorbing devices, for example elements with springs. If a pressure wave occurs, the window pane is deformed, is blown out of the window sash and is held by the retention elements. In this manner, the axial movement of the window pane toward the inside of the premises is prevented and the kinetic energy is nullified.

The solutions known in the prior art for attaching window panes have various disadvantages.

For example, when one end of the safety elements is placed in the intermediate layer of laminated panes consisting of several individual panes assembled together over the whole surface and another end is fed laterally out of the laminated pane (EP 0 320 674 A2, DE 20 2004 005 639 U1), the laminated panes must be manufactured separately for each size of window. It is not possible to cut the laminated panes in a large plate of standard dimensions, as for the manufacture of other windows. Because of this, the costs increase substantially due to individual or short-run manufacture.

This is also valid for the solutions in which the outer plate of a window pane is provided with reliefs or bevels to which the retention elements can be coupled. There is also here a costly operation of machining (of the glass). In the embodiment according to document EP 0 319 695 A1, there arises an additional disadvantage in that the glass insulating plates are assembled rigidly to the infrastructure or to a sash by means of supports. When this solution must be used for a glazing unit attenuating a pressure or shock wave, the infrastructure or the sash with its possible battens for attaching the glass and the glass insulating plates must be dimensioned so as to withstand the impulsion generated by this load. Nor must the glass insulating plates deform under the load to the point of being blown out of their sash. The dimensions of the various components must in this case be relatively voluminous and solid.

The aforementioned disadvantages are certainly not present in the retention elements known via document EP 1 035 295 A2, because they elastically capture the window pane blown out of its sash by a shock wave. The retention elements consisting of wires or cables, visible from the outside, however prevent the clear view through the window and unfavorably influence the appearance of the window or even of the whole building.

BRIEF SUMMARY OF THE INVENTION

The problem at the basis of the invention consists in procuring an improved window pane, attenuating the effect of a pressure or shock wave after an explosion in the manner of an insulating pane, which can be provided with retention elements and which can be manufactured simply and economically.

The window pane according to the invention is constructed in the manner of an insulating pane, so it consists of at least two panes, which are assembled together by their edges by means of a spacing frame. Assembly is usually by bonding, in which the outer rims of the panes extend beyond the spacing frame, so as to form at the edge of the window pane an outward opening groove.

When the window pane must also provide an insulation effect, the space between the panes is gas-sealed and filled with a gas preventing thermal exchange. This gas may also be air at a reduced pressure relative to the atmospheric pressure. In a manner known per se, the spacing frame may be fitted with a reservoir with a desiccating agent, which is provided with openings toward the intermediate space of the pane. This effectively prevents the formation of humidity by condensation.

According to the invention, a flexible, elongated safety element, for example in the form of a metal cable or wire, is placed in the edge groove of the window pane, at least one end of the safety element being fed out of the edge groove and thus emerging beyond the outer dimensions of the window pane. The safety element itself consists of a material which may resist the impulsion of a window pane pushed out of its sash due to a pressure wave. The window pane is therefore captured with the aid of its safety element, which is attached to an element of sash or of building by its end fed out of the edge groove, and is prevented from making an uncontrolled movement.

When the window pane according to the invention must be used in an opening window, the safety element may be attached to both an opening sash and a fixed sash. During the attachment to a fixed sash, the end of the safety element emerging from the window pane must naturally be sufficiently long for it to be still possible to perform a movement/an opening of the window that may be necessary. In particular, in a pivoting window, this arrangement does not however pose any problems, because the necessary extra length of the emerging end of the safety element is relatively short. In a fixed window, the safety element may be anchored in the building itself, independently of the window sash.

Because the window pane is attached by means of the safety element, independently of the sash that contains it (and of its glass retention battens), the sash may be manufactured in a substantially less costly and solid manner than is necessary for a window device attenuating the effect of a pressure or shock wave without a safety element. The last-mentioned window devices must in particular be designed so that the sash holds the window pane in all cases. In addition, the window pane itself must be made in a correspondingly rigid manner, so that it can support the impulse of an explosion, must not deform and consequently must not be blown out of the sash. On the contrary, both the sash and its fitting, therefore the window frame itself, may, with the window pane according to the invention, be manufactured in a simpler and lighter manner (less solid), because the window pane will be sure to be captured after having been blown out of the sash.

The window pane according to the invention is also particularly suitable for equipping existing windows or doors. Because of the variability and flexibility of the ends of the safety element fed out of the window pane, their attachment to an existing sash or in a building opening already present is possible easily and at a low cost.

Given that the safety elements must withstand high forces, materials with a high tear strength are used. In this respect, wires, cables, cords and fabrics made of steel or high strength plastic are found to be of value. Because of the flexibility of said forms of safety elements, the latter may be easily placed in the edge groove of the window pane and have an end fed to the outside.

In the case where there is a risk that the safety element is ripped out of the edge groove in the event of load, it may be attached to the spacing frame, for example by welding or brazing for the metal materials, or by bonding. When the spacing frame consists of prefabricated battens and corner elements assembling the latter to one another, safety elements may already be provided by the manufacturer of the spacing frame. In particular, the corner elements are recommended for this variant, because the latter are identical for all the dimensions of panes, while elongated channel battens must each time be cut to the appropriate length for the pane.

In the variant with the safety elements inserted into the edge groove, the two ends of the latter may also be fed out of the edge groove, to thus achieve a better anchorage to an infrastructure. A safety element may therefore be placed in an edge groove so that the first end of the safety element emerges for example at the top and the other end emerges at the bottom of the window pane. The safety element may however also run round the window pane once, forming a "U", or several times, inside a peripheral edge groove. The ends of the safety element may then leave the periphery of the window pane outside the edge groove, via their imaginary extension in any corner.

In another embodiment of the invention, several safety elements are placed in one or more edge grooves, the window pane again being able to be circumvented only once or several times.

The safety elements may also be placed in the guide elements placed in the edge grooves. The guide elements may be envisaged for example as U-shaped or C-shaped battens and also as closed tubes. The guide elements may be placed locally inside the edge groove or also over a major portion of its length. The opening of the C or U may in this instance face the spacing frame or also the opposite direction. In addition to their guidance function, the guide elements may also provide a better distribution of the load and relieve weight from the spacing frame.

In a preferred embodiment, the guide elements are, in a known manner, incorporated into the spacing frame, due to the fact that the face of the latter oriented away from the intermediate space of the pane is C-shaped or U-shaped and is provided with a hollow tubular space. Such a channel for a spacing frame is known for example through German patent application DE 35 16 875 A1. This patent application also discloses spacing channels with an extension emerging from the face of the pane, which may be inserted into the groove of a frame for the attachment of the pane.

Usually, to seal the intermediate space of the pane, the peripheral edge groove is filled in with a bonding and/or sealing mass as a secondary sealing pad, in addition to the bonding of the spacing frame with the panes. This filler may be used in a particularly advantageous manner to attach the safety and/or guide elements in the edge groove. Particularly when the safety elements or the guide elements are not attached to the spacing frame, the aforementioned peripheral filler may be used for the attachment of the safety and/or guide elements, without an additional operation being necessary. The filler therefore blocks off the intermediate space of the pane of the insulating glazing unit and attaches the safety elements in its edge groove at the same time.

The panes assembled together by means of a spacing frame to form the window pane according to the invention must usually be panes reinforced for the intended purpose, that is to attenuate the effect of a pressure or shock wave after an explosion. As a reinforced pane, a wired glass pane can be used for example. However laminated panes are preferred, which consist of at least two individual panes assembled to one another at the surface. The individual panes may consist of plastic, glass or (partially) prestressed glass. Composites made of glass panes and panes or sheets of resilient plastic, which consist for example of polyethylene terephthalate or polycarbonate, are particularly strong. The individual panes may be assembled together by means of a layer of thermoplastic adhesive, for example of polyvinylbutyral, or by means of a layer of casting resin. As required, a splinter-retention sheet may also be deposited on the surface facing toward the outside of the laminated pane.

In many cases, for example when the window pane according to the invention has to resist particularly powerful shock or pressure waves, it may be necessary to assemble the panes with the spacing frame in a particularly secure manner, to prevent a breakage of the composite and thus a separation of one of the panes. One possibility of ensuring this aspect consists in enlarging the bonding surface between the spacing frame and the panes, therefore using spacing channels of larger cross section with a larger bonding surface than those used for the usual insulating glazing units. Another possibility for ensuring the assembly of the panes consists in arranging additional channels in the form of fasteners, which run round the edge of the pane. These channel fasteners may for example be made of spring steel and remain on the window pane and thus fulfill their function only through their elastic force. Other materials may however also be envisaged, to the extent that they have the necessary strength. If the channel fasteners do not exert any elastic force, they must be attached in another manner, for example by means of a bonded assembly. An appropriate secondary seal filler mass may be used as adhesive for the composite glazing unit or an additional adhesive is used. The aforementioned channel fasteners made of spring steel may of course be additionally bonded to the window pane. The channel fasteners are placed either locally on one or more of the rims of the pane or over the whole length of one or more of the rims of the pane.

Other details and advantages of the object of the invention will appear, without intended limitation, through the drawings of exemplary embodiments of window panes with safety elements according to the present invention and through their detailed description that follows.

BRIEF DESCRIPTION OF THE DRAWINGS

In these simplified representations, with no particular scale.

DETAILED DESCRIPTION OF THE INVENTION

Figure 1:
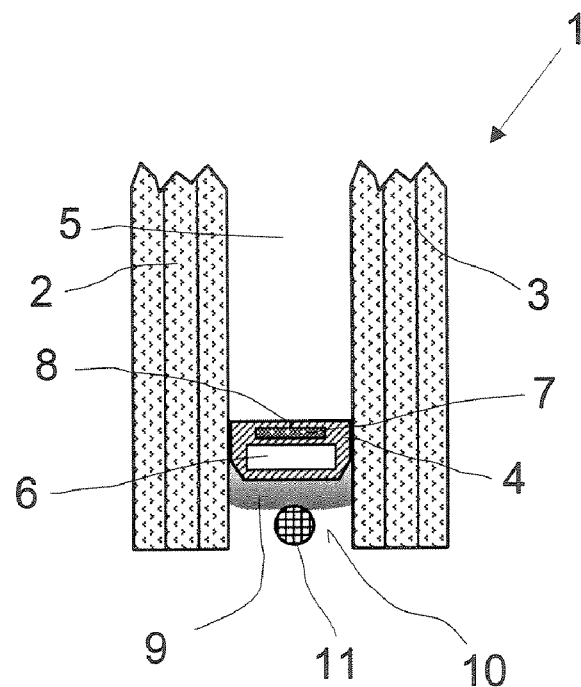
FIG. 1 shows a first embodiment with a safety element placed in the edge groove of the window pane, represented in section.

According to FIG. 1, a window pane 1 according to the invention consists of two panes 2, 3, made of laminated glass, that are fixedly bonded together with interposition of channels 4 of a spacing frame and enclosing between them a space 5. The intermediate space 5 is filled with a gas which resists the transfer of heat. Each of the panes 2, 3 consists of three prestressed glass panes assembled together by means of polyvinylbutyral thermoplastic adhesive sheets or other appropriate adhesive materials and thus forms reinforced panes known per se. In the context of the invention, as has already been mentioned, plastic panes may however of course also be used, for example but not exclusively as the central pane in the triple composite.

The channel 4 of the spacing frame has a hollow space 6, into which tabs of other channels, in particular corner connectors, may be inserted. In this manner, channel parts and spacing frames of any length can be manufactured. The corner connectors may have different angles, so that it is possible to produce window panes having any number of corners. The points of abutment of the channels must naturally be joined and filled securely together.

Another hollow space 7 in the channel 4 is filled with a hygroscopic agent. Openings 8 connect the hollow space 7 with the intermediate space 5 of the pane, so that the hygroscopic agent can act on the gas in the space 5. This effectively prevents the condensation of water vapor on the inner faces of the panes 2 and 3.

In addition to its bonding with the panes 2 and 3, the channel 4 and then the intermediate space 5 of the pane is filled with a sealing mass 9 (for example polysulfide). The channel 4 is placed between the panes 2 and 3 so as to form a recessed edge groove 10. This groove 10 receives both the sealing mass 9 and a steel safety element 11 in the form of a cable.

In the representations that follow, identical elements are indicated by the same reference numbers and they are not explained again, to the extent that they are not modified relative to FIG. 1.

Figure 2:
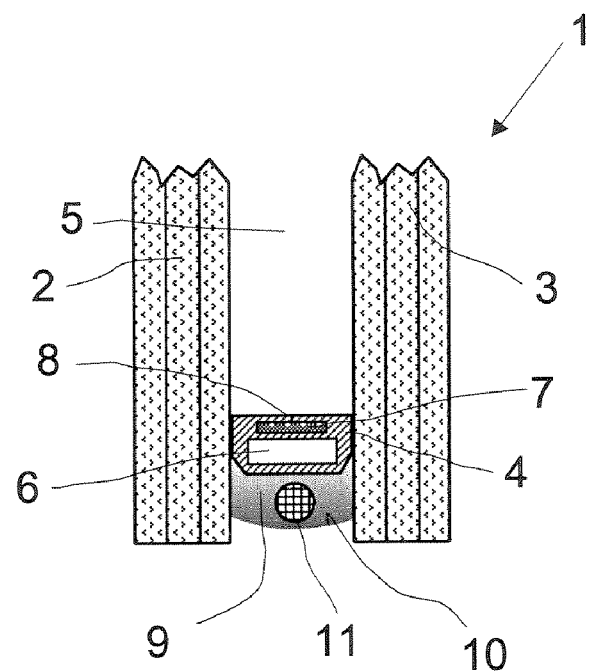
FIG. 2 shows a second embodiment with a safety element placed in the edge groove of the window pane and sunk into a sealing mass, represented in section.

The safety element 11 in FIG. 2 is also a steel cable which, unlike the embodiment according to FIG. 1, has however been placed in the edge groove 10 before the intermediate space of the pane is filled in by means of the sealing mass 9. First, the safety element 11 may in this manner be attached simply, which makes handling easier before the window pane is installed and transported. Secondly, the reaction forces to be transmitted between the safety element 11 and the window pane 1 are distributed over a larger area of the panes 2 or 3 and over the spacing channel 4. Because of this, the safety and/or the load limit of the window pane are increased.

Figure 3:
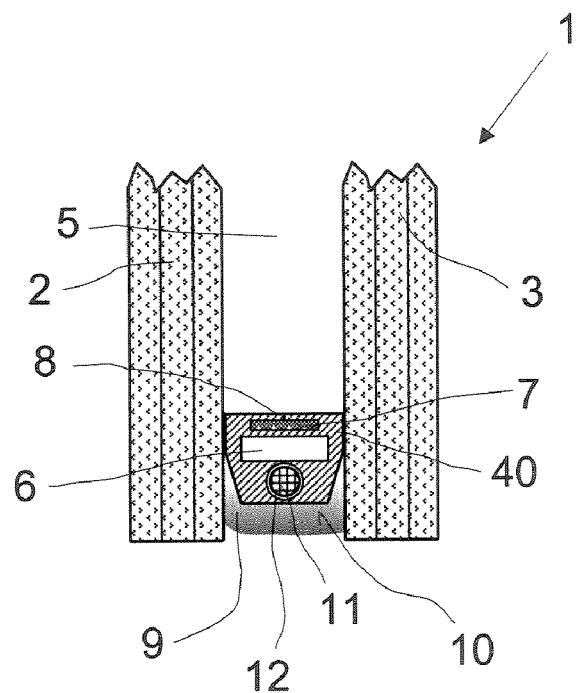
FIG. 3 shows a third embodiment represented in section, with a spacing frame channel with an incorporated tubular guide element, which contains the safety element.

FIG. 3 represents an embodiment of the window pane 1 according to the invention, in which the safety element 11 is also guided. Accordingly, a spacing channel 40 has a tubular recess 12 through which the safety element in the form of a cable 11 is placed. The corner connectors for the channels 40 may be configured so that the recess 12 is free at the point of junction with the channel 40 and that the safety element 11 can thus be fed out of the edge groove 10. It is however equally possible to provide the tubular recess 12, in any location along the channel 40, with an opening in the direction of the edge groove 10, to feed the safety element 11 out of the latter. In both cases, the position of the safety element 11 must naturally be fixed and its ends be fed out of the surface of the pane, before the sealing mass 9 is applied.

Unlike the representation, the recess in the spacing channel could also open over the whole length toward the outer rim of the window pane 1 (in the form of a channel or groove). Instead of a recess, it is also possible to imagine providing for the safety element a separate guide channel which is either sunk into the peripheral seal independently of the spacing channel or fixedly attached to the latter.

Figure 4:
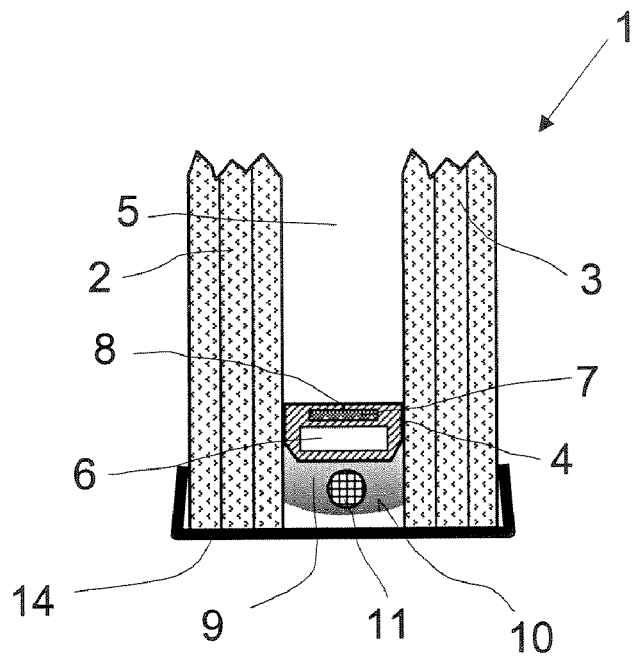
FIG. 4 shows an embodiment according to FIG. 1 with a channel fastener.

The section represented in FIG. 4 shows a variant of the embodiment according to FIG. 2, in which one channel fastener or several local channel fasteners 14 are placed along the rims of the window pane. The channel fasteners 14 encompass the two panes 2 and 3 in their edge region. They are made of spring steel and have, after they have been installed, a strong prestress such that the panes 2 and 3 cannot separate from one another, even in the case of possible breakage by overload of their bonded assembly with the spacing frame channels. They also encompass the safety element 11 and may ensure the position respectively the retention of the latter in the edge groove.

Figure 5:
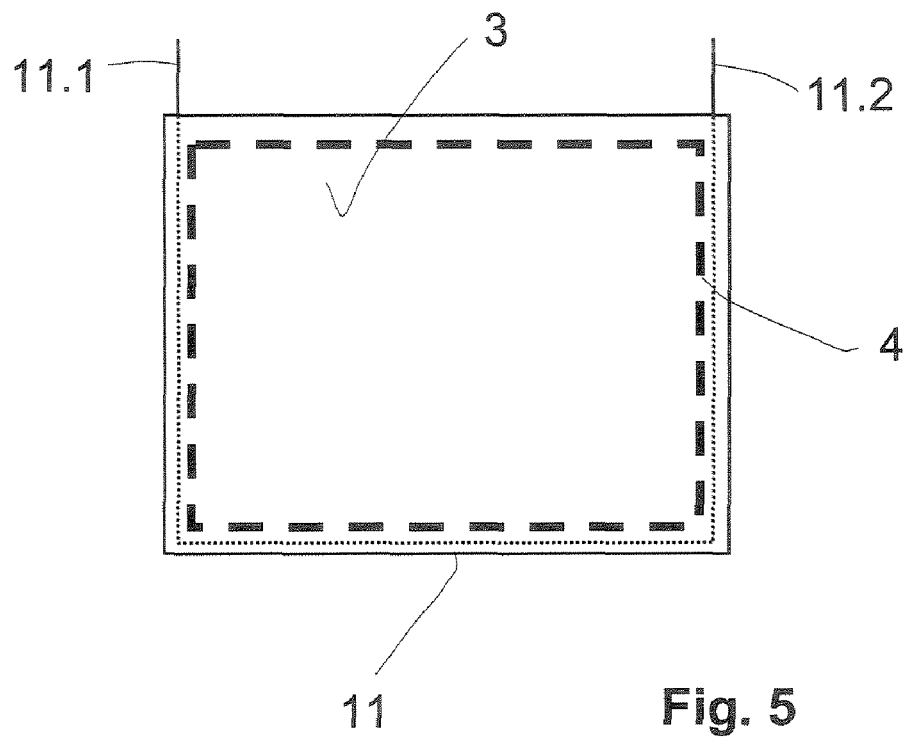
FIG. 5 represents an embodiment, in which the safety element surrounds the spacing frame in the shape of a U.

FIG. 5 shows a window pane 1 according to the invention seen in elevation, with the pane 3 and the spacing frame 4 masked by the latter and represented schematically as broken lines. The safety element 11 is placed in a U-shape inside the edge groove 10 all around the spacing frame 4, its two ends 11.1 and 11.2 are fed upward out of the lateral edge grooves 10 and may be attached to another construction element not shown.

Figure 6:
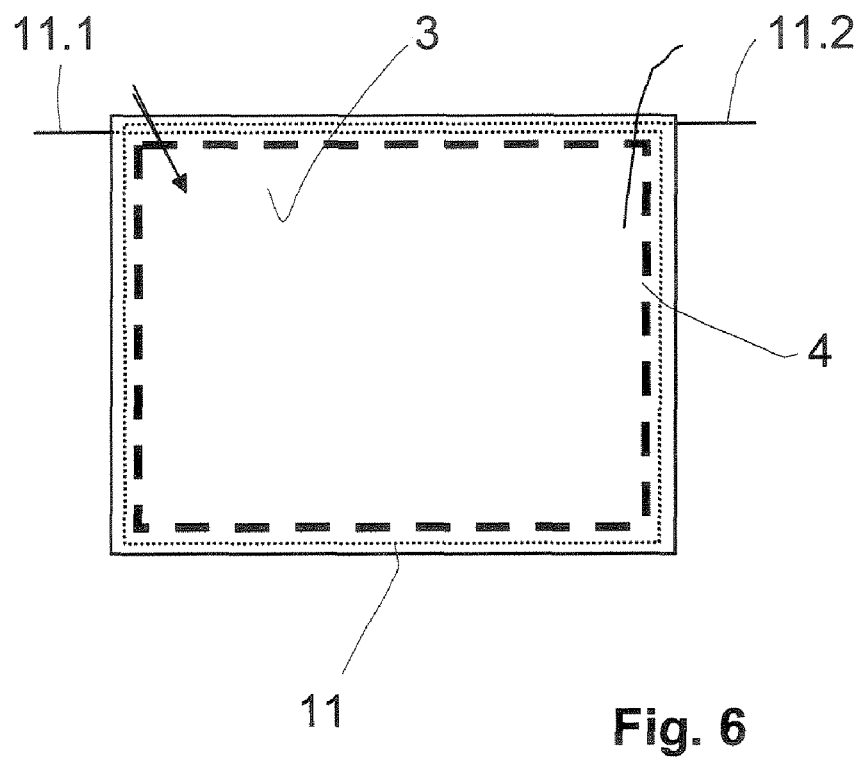
FIG. 6 represents an embodiment in which the safety element runs all the way round the spacing frame, and in which the two ends of the safety element are fed out of the edge groove in opposite corners.

In the embodiment represented in FIG. 6, the safety element 11 in the form of a cable runs all the way round the spacing frame 4, the two ends 11.1 and 11.2 of the safety element of course being fed out of the same edge groove 10, but on opposite sides. In this top edge groove, the safety element is therefore laid doubly, respectively with two lengths.

Figure 7:
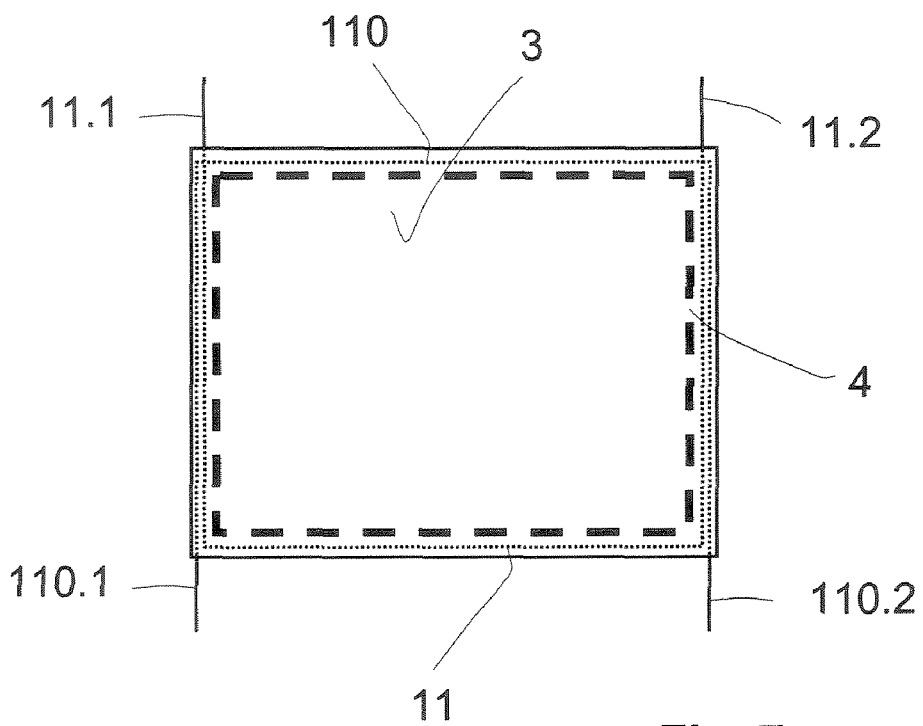
FIG. 7 represents a variant of the window pane, in which two safety elements surround the spacing frame in the shape of a U.

FIG. 7 shows a variant in which, in addition to the safety element 11, a second identical safety element 110 is laid in a U-shape, as represented in FIG. 5, around the spacing frame. The openings of the U-shaped loops are, in this instance, oriented in opposite directions, so that the ends 11.1 and 110.1, respectively 11.2 and 110.2, are fed out of the same edge groove, but in opposite directions. In this embodiment, the window pane 1 may be attached at four points to an outside construction element.

Figure 8:
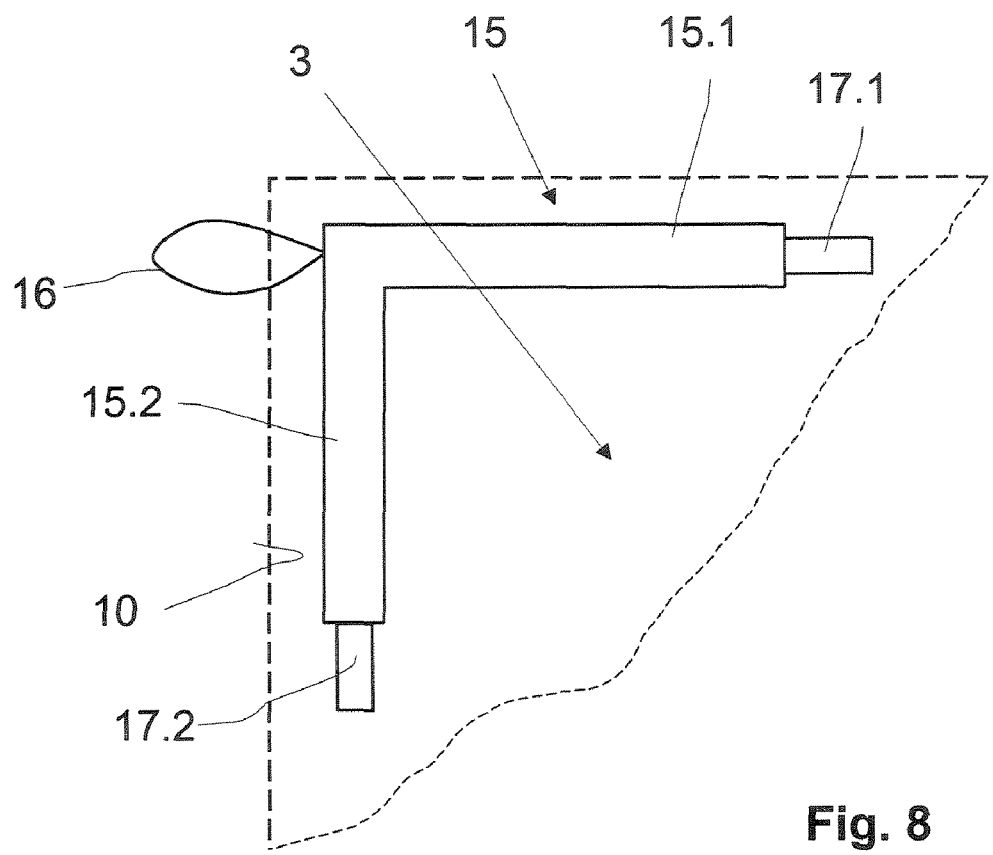
FIG. 8 shows a corner bracket of one embodiment, in which the safety element is attached directly to the corner bracket of the spacing frame.

FIG. 8 represents an aluminum corner bracket 15, to which a flexible safety element 16 is attached in a loop. The safety element 16 may for example be a steel cable, which is brazed onto the corner bracket 15. The corner bracket 15 has channel portions 15.1 and 15.2 which have substantially the same cross section as the channel 4, and junction tabs 17.1 and 17.2. The latter are dimensioned so that they can be inserted in a tight fit into the hollow space 6 of the channel 4. In this manner, it is for example possible to form a closed frame with four channels 4 and four corner brackets 15.

The safety element 16 is in this case also fed out of the edge groove 10 of the window pane. As an illustration, a portion of the periphery of the pane 3 has been drawn as broken lines.

The invention claimed is:

1. A window pane for an attenuating effect of a pressure or shock wave after an explosion, the window pane comprising:
   a safety element including a first end and a second end, the safety element being a flexible cable having two ends; and
   at least two panes placed at a distance from one another and enclosing a space between them, the panes assembled together in peripheral edge regions thereof by a spacing frame forming respective edge grooves around each side of the window pane,
   wherein the safety element is placed inside at least one edge groove, and the two ends of the safety element are fed out of one of the edge grooves on the same side of the window pane.

2. The window pane as claimed in claim 1, wherein the safety element is made of steel.

3. The window pane as claimed in claim 1, wherein the safety element is made of high strength plastic.

4. The window pane as claimed in claim 1, wherein the safety element is attached to the spacing frame.

5. The window pane as claimed in claim 1, wherein the two ends of the safety element are fed out of one edge groove on opposite sides of the same edge groove.

6. The window pane as claimed in claim 1, wherein the safety element runs entirely around the window pane one or more times inside one edge groove.

7. The window pane as claimed in claim 6, wherein the two ends of the safety element are fed out of various portions of one edge groove.

8. The window pane as claimed in claim 5, wherein two or more than two safety elements are placed inside the edge grooves.

9. The window pane as claimed in claim 8, wherein the safety elements are placed in guide elements placed inside the edge grooves.

10. The window pane as claimed in claim 9, wherein the guide element has a tubular opening to receive the safety element.

11. The window pane as claimed in claim 9, wherein the guide element has a U-shaped or C-shaped cross section, in the opening of which the safety element is placed.

12. The window pane as claimed in claim 9, wherein the guide element is incorporated into the spacing frame or is fixedly assembled to the spacing frame.

13. The window pane as claimed in claim 12, wherein the edge groove is filled in with a sealing and/or bonding mass and the safety element and/or the guide element is sunk at least partially in the sealing and/or bonding mass.

14. The window pane as claimed in claim 1, wherein at least one of the panes assembled together by the spacing frame is a laminated pane.

15. The window pane as claimed in claim 1, further comprising at least one fastening element at least locally running around at least one of its edges edge of the window pane.

16. The window pane as claimed in claim 1, wherein the edge grooves are filled in with a sealing and/or bonding mass and the safety element is sunk at least partially in the sealing and/or bonding mass.

17. The window pane as claimed in claim 5, wherein the two ends of the safety element are fed out of a top and bottom of the window pane with respect to the ground.

18. The window pane as claimed in claim 1, wherein the space defined by and between the two frames is filled with a gas which resists heat transfer.

19. The window pane as claimed in claim 1, wherein at least one end of the safety element fed out of the edge groove is attached to a building.

20. The window pane as claimed in claim 1, wherein the safety element is made of a material having a high tear strength.

21. A window pane for an attenuating effect of a pressure or shock wave after an explosion, the window pane comprising:
   a safety element including a first end and a second end, the safety element being a flexible cable having two ends; and
   at least two panes placed at a distance from one another and enclosing a space between them, the panes assembled together in peripheral edge regions thereof by a spacing frame forming respective edge grooves around each side of the window pane,
   wherein the safety element is placed inside at least one edge groove, and the two ends of the safety element are fed out of one of the edge grooves on the same side of the window pane, and
   wherein each of the at least two panes consists of three prestressed glass panes assembled together.

* * * * *

UNITED STATES PATENT AND TRADEMARK OFFICE
CERTIFICATE OF CORRECTION

PATENT NO. : 7,818,944 B2  
APPLICATION NO. : 11/722626  
DATED : October 26, 2010  
INVENTOR(S) : Ulrich Hermens Page 1 of 1

It is certified that error appears in the above-identified patent and that said Letters Patent is hereby corrected as shown below:

Column 8, line 28, delete "of its edges."

Signed and Sealed this
Twenty-second Day of March, 2011

David J. Kappos
*Director of the United States Patent and Trademark Office*